United States Patent [19]

Sakurai et al.

[11] Patent Number: 4,667,443
[45] Date of Patent: May 26, 1987

[54] END FACE GRINDING APPARATUS

[76] Inventors: Kaoru Sakurai, 4-10-30, Chiyogaoka, Kawasaki-shi, Kanagawa-ken; Kazushi Shinozaki, 12-13, Shiratori-dai, Yokohama-shi, Kanagawa-ken, both of Japan

[21] Appl. No.: 771,222

[22] Filed: Aug. 30, 1985

[30] Foreign Application Priority Data

Sep. 6, 1984 [JP] Japan .................. 59-187085

[51] Int. Cl.$^4$ .................. B24B 9/10; B24B 17/10
[52] U.S. Cl. .................. 51/99; 51/35; 51/101 R; 51/105 EC; 51/165.71; 51/283 E
[58] Field of Search .................. 51/35, 45, 47, 50 R, 51/50 PC, 92 R, 95 WH, 98 R, 99, 100 R, 101 R, 101 LG, 105 EC, 105 LG, 106 LG, 165.71, 165.76, 165.77, 165.9, 165.91, 165.92, 283 E

[56] References Cited

U.S. PATENT DOCUMENTS

| | | | |
|---|---|---|---|
| 729,667 | 6/1903 | Robinson | 51/47 |
| 2,723,598 | 11/1955 | Mann | 51/99 X |
| 2,727,340 | 12/1955 | Zanotta | 51/99 X |
| 3,798,843 | 3/1974 | Weatherell | 51/45 X |
| 3,827,189 | 8/1974 | Highberg | 51/99 X |
| 4,228,617 | 10/1980 | Bando | 51/283 E X |
| 4,478,007 | 10/1984 | Bavelloni | 51/101 R X |
| 4,519,167 | 5/1985 | Halberschmidt et al. | 51/35 |
| 4,528,780 | 7/1985 | Halberschmidt et al. | 51/101 R X |

FOREIGN PATENT DOCUMENTS

| | | |
|---|---|---|
| 154044 | 10/1983 | Japan . |
| 37040 | 2/1984 | Japan . |
| 751587 | 7/1980 | U.S.S.R. .................. 51/99 |

Primary Examiner—Robert P. Olszewski
Attorney, Agent, or Firm—James P. Ryther

[57] ABSTRACT

A one-joint type horizontal pivot arm is adopted as contour tracing mechanism for controlling the position of a grinding unit along a contour of a plate material. The grinding unit is attached to a distal end of the pivot arm and is position-controlled by angular controls about a first axis at a base of the arm and about a second axis at a joint of the arm. A third axis is provided to the end of the pivot arm for facing the grinding unit in the direction normal to the end face. A pressure device is provided for urging the grinding unit against the end face. The position, facing direction and pressure of the grinding unit are controlled with preset teaching data sampled by tracing a model type to be end-face ground.

14 Claims, 14 Drawing Figures

END FACE GRINDING APPARATUS

BACKGROUND OF THE INVENTION

1. Field of the Invention:

The present invention relates to an end face grinding apparatus for, e.g., a glass plate.

2. Description of the Prior Art:

In a process of cutting a rectangular, trapezoidal or fan-shape glass plate from a large glass plate and grinding (chamfering, plane grinding, U-shape grinding, polishing or the like) end face of the cut plate, conventionally, an operator manually urges a grinding wheel rotating at high speed against the end face of the cut glass plate. The glass plate is drawn by suction so as to be fixed on a rotating table, and is rotated at a constant low speed. On the other hand, a grinding unit including a drive motor and the grinding wheel is supported by a swing arm which can be horizontally pivoted in a direction of a glass plate end face. The end face grinding operation is performed such that a handle provided to the swing arm is pressed so as to urge the grinding wheel against the end face of the glass plate rotating at low speed.

Therefore, in the conventional grinding process, since a manual operation must be performed, a grinding pressure is not uniform. If a rotating speed of the glass plate is constant, the peripheral speed of the end face is changed in accordance with the contour of the glass plate, resulting in irregular grinding speed and variation in grinding margin. Particularly, when an end face of a complex-shaped glass plate such as a windshield glass of a vehicle is to be uniformly chamfered, a highly skilled technique is required. When the grinding wheel is abruptly urged against the glass end face at the grinding start point, the glass plate may be damaged.

For the purpose of automation, there has been proposed, an apparatus in which a grinding unit is movably mounted on a track frame extending along the radial direction with respect to the center of a glass plate, and the glass plate is ground while moving the grinding wheel along a peripheral surface of the glass plate (Japanese Utility Model Application Laid Open No. 154044/83). However, in such an apparatus, since the moving speed of the grinding wheel is manually adjusted so as to obtain a uniform grinding margin, the above-mentioned drawbacks cannot be fully overcome, and variation in grinding margin cannot be eliminated due to manual operation.

Another grinding apparatus comprising a grinding unit movable along the X-Y axes has been proposed so as to grind a contour end face of a glass plate in accordance with NC data (Japanese patent application Laid Open No. 37040/84). According to the apparatus, a grinding speed of the grinding wheel (contour trace speed) can be set constant irrespective of an outer shape of the glass plate. However, the apparatus becomes as large as an NC machine, resulting in high cost and large insulation area.

SUMMARY OF THE INVENTION

The present invention has been made in view of the above situation, and has as its object to provide a grinding apparatus which can automatically adjust a grinding speed with a simple structure so as to obtain a uniform grinding margin.

An end face grinding apparatus of the present invention comprises a contour tracing means for controlling the position of a grinding unit (a grinding wheel 4 etc.) along a contour tracing material to be end-face ground. The contour tracing means comprises a one-joint type horizontal pivot arm means (60, 62) for controlling the position of the grinding tool about a first axis ($\theta 1$) of an arm base portion and a second axis ($\theta 2$) of a joint portion in accordance with numerical control.

A third axis ($\theta 3$) is provided at a distal end of the horizontal pivot arm to direct the grinding unit in a direction normal to an end face of the plate material for applying a grinding pressure. A pressure means (pneumatic cylinder in the embodiment) for generating the grinding pressure is controlled with grinding pressure data preset in accordance with the shape of the contour of the plate material.

With the above arrangement, since the end face can be ground while controlling the speed and grinding pressure of the grinding tool along the contour of the plate material, automatic grinding with a uniform grinding margin can be performed with a simple apparatus without being influenced by the shape of the end face.

DETAILED DESCRIPTION OF THE PREFERRED EMBODIMENTS

An embodiment of the present invention will be described hereinafter.

Figure 1:
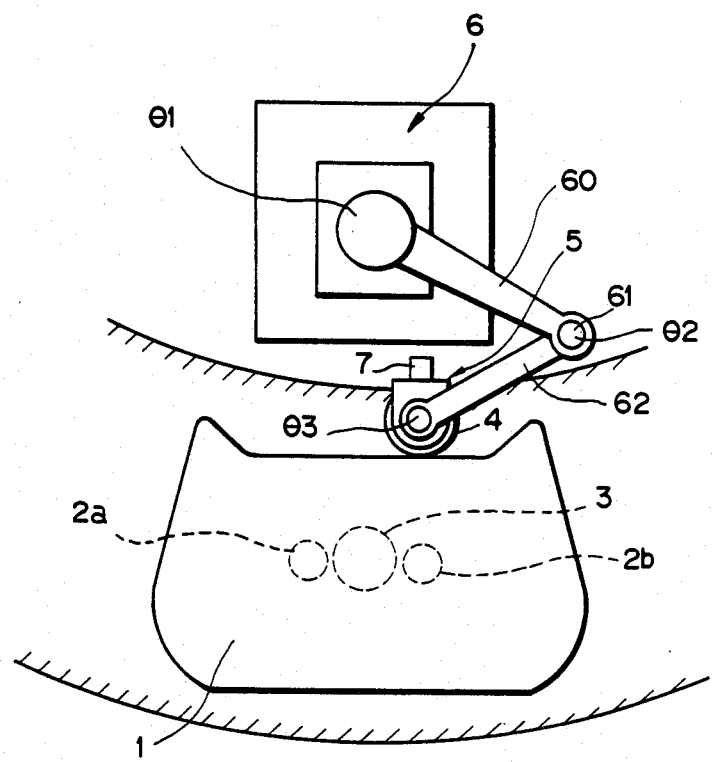
FIG. 1 is a plan view of a grinding apparatus to which the present invention is applied.
Figure 2:
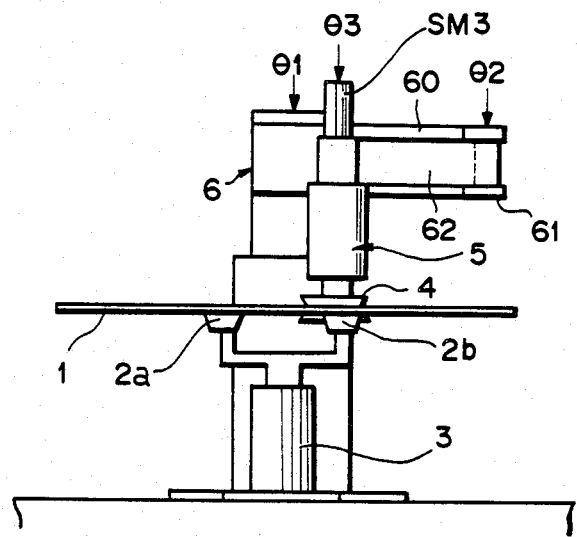
FIGS. 2 and 3 are side views.
Figure 3:
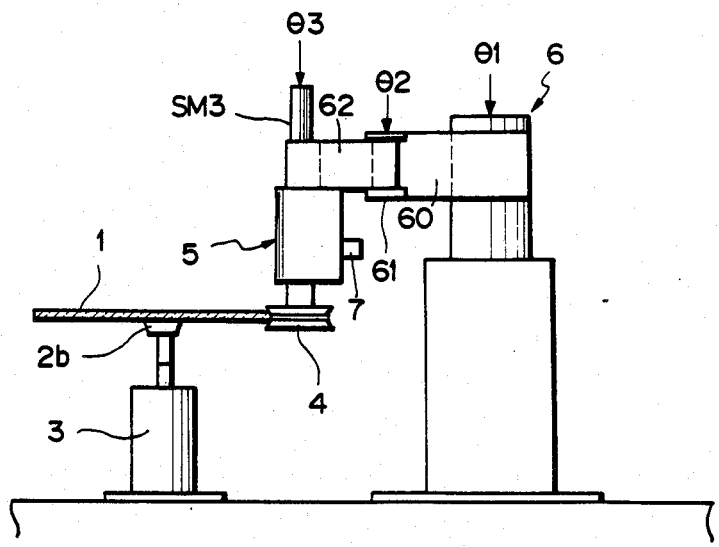

FIG. 1 is a plan view of a grinding apparatus to which the present invention is applied, and FIGS. 2 and 3 are side views. In this embodiment, a glass plate 1 whose end face is to be ground is a windshield glass of a vehicle. The glass plate 1 is horizontally supported by a base 3 having a pair of suction pads 2a and 2b, and end-face grinding (chamfering and the like) is performed in such a manner that a rotating grinding wheel is urged against an end face of the plate 1 so as to trace an outer periphery of the plate 1.

A grinding unit 5 consisting of a grinding wheel 4, a drive motor etc. is moved along an outer contour of the glass plate 1 by an industrial robot 6 comprising a one-joint type horizontal pivot arm. Outer contour data is stored as NC data in a robot control unit in advance by tracing an end face of a model plate. During the grinding operation, the position of the grinding unit 5 is controlled in accordance with the NC data corresponding to the outer contour data so that the grinding wheel traces the end face of the glass plate 1.

The industrial robot 6 can be a commercially available model, and comprises a first horizontal pivot arm 60, a joint 61 at its distal end, and a second horizontal pivot arm 62 extending from the joint. Servo motors are built into a first rotating shaft (first axis) $\theta 1$ at the base end of the horizontal pivot arm 60 and a second rotating shaft (second axis) $\theta 2$ at the base end of the horizontal pivot arm 62, and perform rotating angle control of the respective arms.

A vertical third shaft (third axis) $\theta 3$ is provided at a distal end of the second horizontal pivot arm 62, and performs angular control of the grinding unit 5 mounted at the distal end of the arm 62. An application direction of the grinding pressure for urging the grinding wheel 4 against the end face of the glass plate 1 is controlled by a servo motor of the third shaft $\theta 3$ to be in the direction normal to the end face. The grinding pressure can be applied by urging a spindle of the grinding wheel 4 in a direction toward the end face by a pneumatic cylinder 7 arranged along the horizontal direction.

The pressure direction of the pneumatic cylinder 7 is the fourth axis. A margin along the fourth axis is given to the grinding wheel 4, so that if a preset path of the grinding wheel 4 is shifted from the outer periphery of the glass plate 1, this shift can be absorbed by the cylinder 7. Therefore, the glass plate 1 can be fixed with relatively poor alignment precision by the pads 2a and 2b, and playback properties of the robot 6 with respect to teaching data may be second-rate. The number of teaching points along the outer periphery of the glass plate can decreased.

The grinding pressure can be adjusted or controlled to be constant. In addition, the grinding pressure can be partially increased/decreased at need by pneumatic pressure adjustment so as to perform correction of the grinding margin in details while tracing the glass plate 1.

Figure 4:
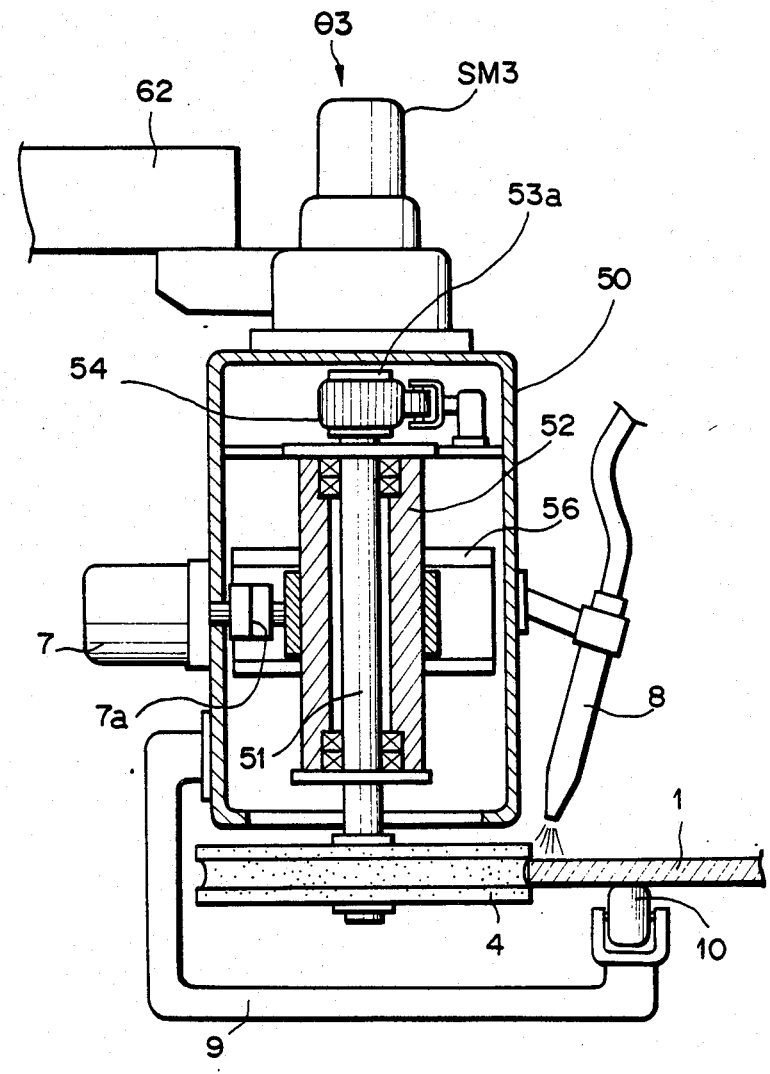
FIGS. 4 and 5 are cross sectional views showing a grinding unit in detail.
Figure 5:
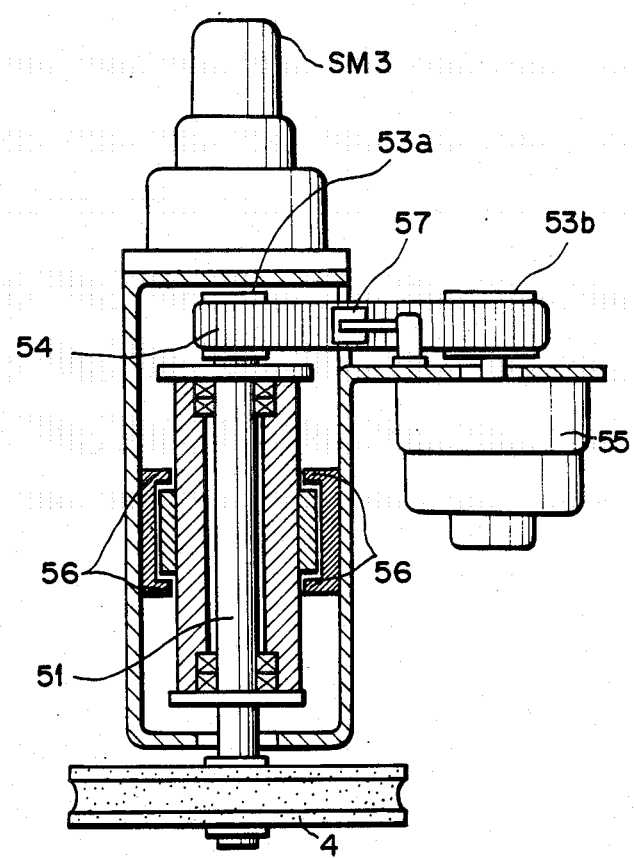

FIGS. 4 and 5 show cross-sectional views of the grinding unit 5. As described above, the grinding unit 5 is mounted at the distal end of the horizontal pivot arm 62 through the third shaft $\theta 3$. The third shaft $\theta 3$ is driven by a servo motor SM3. A bearing 52 is vertically arranged in a housing 50 of the grinding unit 5, and a spindle 51 is axially supported therein. The grinding wheel 4 is mounted at the distal end of the spindle 51, and the rear end of the spindle 51 is coupled to a shaft of a drive motor 55 through pulleys 53a and 53b and a belt 54.

The bearing unit 52 is horizontally slidably mounted in the housing 50 through the slide guide 56, and can be horizontally deviated by extension/contraction of a piston rod 7a of the pneumatic cylinder 7. A coil spring can be used instead of the cylinder 7. Since the belt 54 must be extended/contracted in accordance with deviation of the bearing 52, a tensioner 57 for pressing the side surface of the belt 54 is provided to absorb a deviation amount of a loop length of the belt 54 upon deviation of the bearing unit 52.

A cooling water injection nozzle 8 is provided on the side surface of the housing 50 so as to inject a grinding liquid to a grinding portion. A support arm 9 extends from the side surface of the housing 50 below the grinding wheel 4 to a portion near the grinding portion, and a roller 10 contacting the lower surface of the glass plate 1 is mounted at the distal end of the arm 9. Flexing of the glass caused by urging the grinding wheel 4 against the end face of the glass plate 1 can be prevented by the roller 10.

Figure 6:
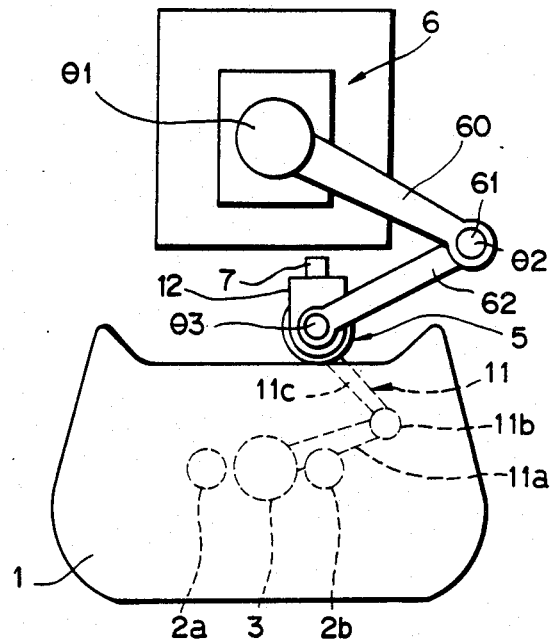
FIG. 6 is a plan view showing a modification of the grinding apparatus.
Figure 7:
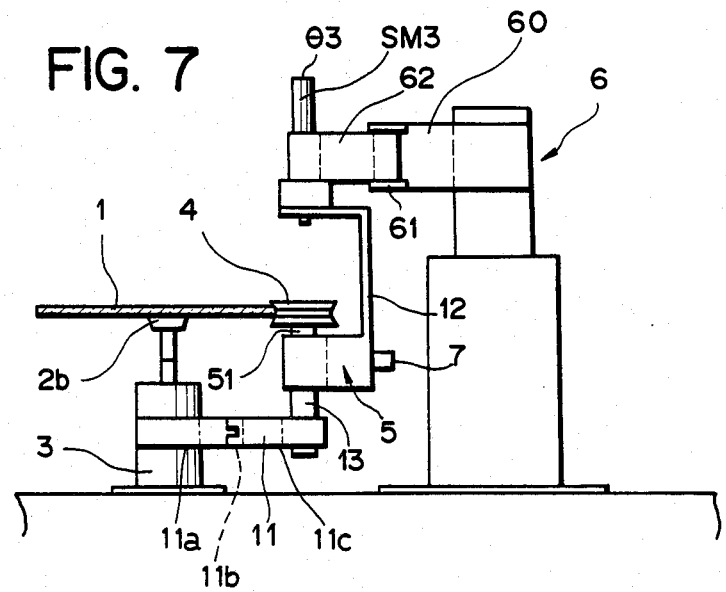
FIG. 7 is a side view of FIG. 6.

FIG. 6 is a plan view showing a modification of the grinding apparatus of the present invention, and FIG. 7 is a side view. In this modification, in order to support the grinding unit, a support arm 11 of one joint type additionally used. The support arm 11 comprises a horizontal pivot arm 11a rotatably and axially supported by a base 3 for supporting the glass plate 1 by means of the pads 2a and 2b, a joint 11b at its distal end and a horizontal pivot arm 11c extending from the joint. The grinding unit 5 is supported at the distal end of the horizontal pivot arm 11c, and a portion of the grinding unit 5 is coupled to a distal end of the horizontal pivot arm 62 of an industrial robot 6 through an L-shaped member 12. In this modification, the spindle 51 for mounting the grinding wheel 4 extends upward from an upper portion of the grinding unit 5 supported by the support arm 11.

The industrial robot 6 moves the grinding wheel 4 along the outer periphery of the glass plate 1 in accordance with contour data in the same manner as in the first to fifth embodiments. On the other hand, the support arm 11 can be freely moved so as to follow the movement of the arm of the robot while supporting the weight of the grinding unit 5. The third shaft $\theta 3$ is controlled by the servo motor SM3 coaxial with the spindle 51. The servo motor SM3 is mounted at the distal end of the horizontal pivot arm 62, and controls through the L-shaped member 12 the pressure application direction of the pneumatic cylinder 7 for applying the grinding pressure. In order to hold the grinding unit 5 to be pivotal about the third shaft $\theta 3$, a thrust bearing 13 aligned with the third shaft is interposed between the distal end of the support arm 11 and the grinding unit 5.

According to a modification of FIGS. 6 and 7, a fixed drive motor may be provided in the base 3, and a rotating force is transmitted to the spindle 51 through a belt inserted in the hollow support arm 11 so as to rotate the grinding wheel 4. With this arrangement, the weight of the grinding unit 5 can be reduced.

Figure 8:
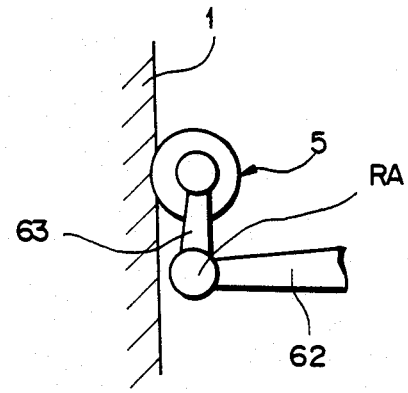
FIG. 8 is a partial plan view showing a modification of a compressing means for applying a grinding pressure.

FIG. 8 is a plan view of an essential part of the grinding portion showing another method for applying a grinding pressure. In this modification, a third horizontal pivot arm 63 is mounted on the third shaft $\theta 3$ at the distal end portion of the horizontal pivot arm 62 of the robot 6, and the grinding unit 5 is mounted at the distal end of the arm 63. The first and second horizontal pivot arms 61 and 62 of the robot 6 move the grinding wheel 4 along the outer contour of the glass plate 1 in accordance with preset trace data while holding the third horizontal pivot arm 63 parallel to the tangent of the glass plate 1.

The third horizontal pivot arm 63 is not directly used for aligning the grinding wheel 4. However, a rotational torque for urging the grinding wheel 4 in a direction toward the end face of the glass plate 1 is applied by a rotating actuator RA. In order to keep the grinding pressure constant, a torque limiter is interposed between the rotating actuator RA and the third shaft $\theta 3$. Ihe rotating actuator RA may be of a type which changes extension/contraction of the piston rod of the pneumatic cylinder into a rotating movement by means of a rack and a pinion. A coil spring can be used in place of the rotating actuator.

In the above embodiment and the modification of FIGS. 1 to 7, the glass plate is fixed by the pads 2a and 2b of the base 3, and the grinding unit 5 traces the outer contour of the glass plate 1 by the arms 60 and 62 of the robot 6. In this case, a work range of the robot 6 covers, e.g., a hatched portion of FIG. 1. When the glass plate 1 is large, i.e., out of the work range, or the work range of the robot becomes small in accordance with various conditions, the glass plate 1 is rotated through 90° or 180° using the base 3 as a rotating table, and the grinding operation can be performed stepwise at each rotation stop position. Alternatively, the base 3 can be set slidable with respect to the robot 6 so as to perform the grinding operation at each slide position. Furthermore, the above-mentioned rotation and slide movement can be used in combination. The grinding operation can be performed while rotating the base 3 at a constant speed. A plurality of industrial robots can be provided so as to grind respective sides of a single glass plate 1.

Figure 9:
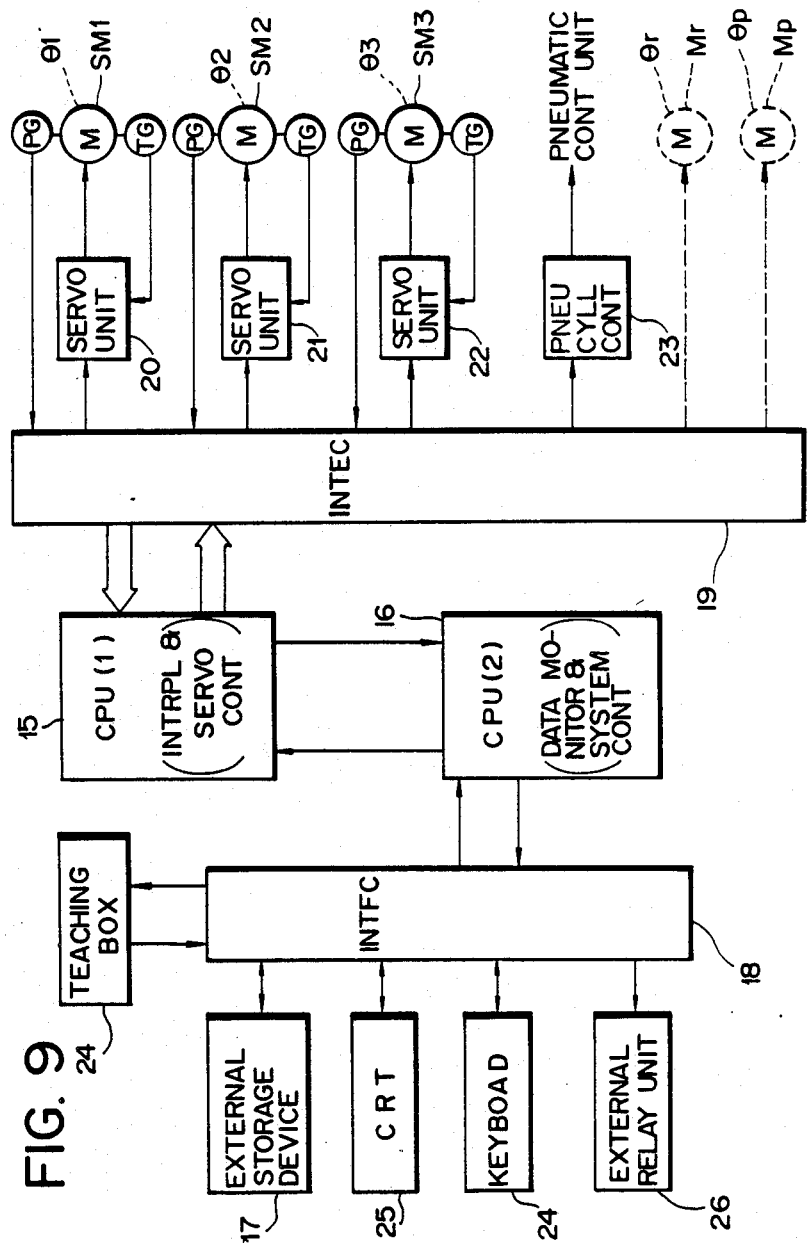
FIG. 9 is a block diagram of a control unit of an industrial robot.

FIG. 9 shows a block diagram of a control unit of the industrial robot used in the grinding apparatus of the present invention. As shown in FIG. 9, the control unit comprises a first CPU 15 and a second CPU 16. The first CPU 15 mainly performs interpolation of NC data and servo control of the motors in the respective shafts, and the second CPU 16 monitors the NC data and performs system control. Control data and control program for performing end face grinding operation of the glass plate are inputted from an external storage device 17 such as a floppy disc drive in a memory of the second CPU 16 through an interface 18. The first CPU 15 performs linear or curvilinear interpolation in accordance with the data from the CPU 16 so as to form NC data, and supplies the data to servo units 20 to 22 of the first to third shafts ($\theta 1$ to $\theta 3$) through an NC control interface 19. The servo units 20 to 22 supply a control current output to the servo motors SM1 to SM3 of the respective shafts.

As in a general NC apparatus, a tacho generator TG and a pulse generator PG are connected to each of the servo motors SM1 to SM3. The outputs from the tacho generators TG are fed back to the corresponding servo units so as to control the servo motors SM1 to SM3 at designated rotating speeds. The outputs from the pulse generators PG generated for every unit rotating angle of the motors SM1 to SM3 are fed back as position data to the CPU 15 through the NC control interface 19, and operation control is performed so that the positions of the three shafts coincide with the NC data.

Note that system running and monitoring operations and correction of data and program are performed by using a keyboard 24 and a CRT 25 connected to the second CPU 16 through the interface 18. Control signals are supplied to an external relay unit 26 used for various types of control in the grinding apparatus through the interface 18. Furthermore, as described above, when the grinding pressure is changed by adjusting the pneumatic pressure of the pneumatic cylinder 7 in the grinding unit 5, a control signal is supplied to a pneumatic cylinder controller 23 from the first CPU 15 through the interface 19 in accordance with preset grinding pressure data corresponding to the outer periphery of the glass plate 1, and a pneumatic pressure control unit (to be described later) is operated in accordance with the output from the controller 23.

As described above, when the glass plate 1 is rotated or slid in order to effectively use the work range of the robot 6, a drive instruction is supplied to motors Mr and Mp of a rotating axis $\theta r$ and linear movement axis $\theta p$, respectively. In this case, the respective motors can be servo-controlled, if needed.

Figure 10:
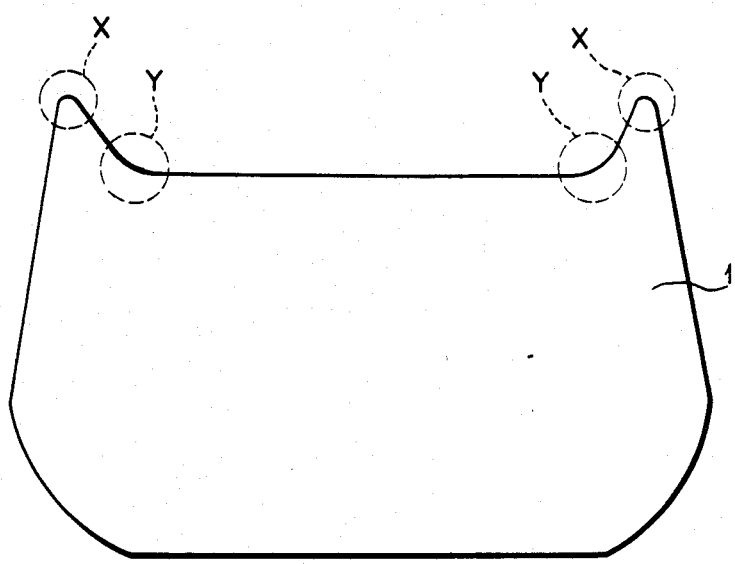
FIG. 10 is a detailed plan view showing an example of a glass plate to be end-face ground.
Figure 11:
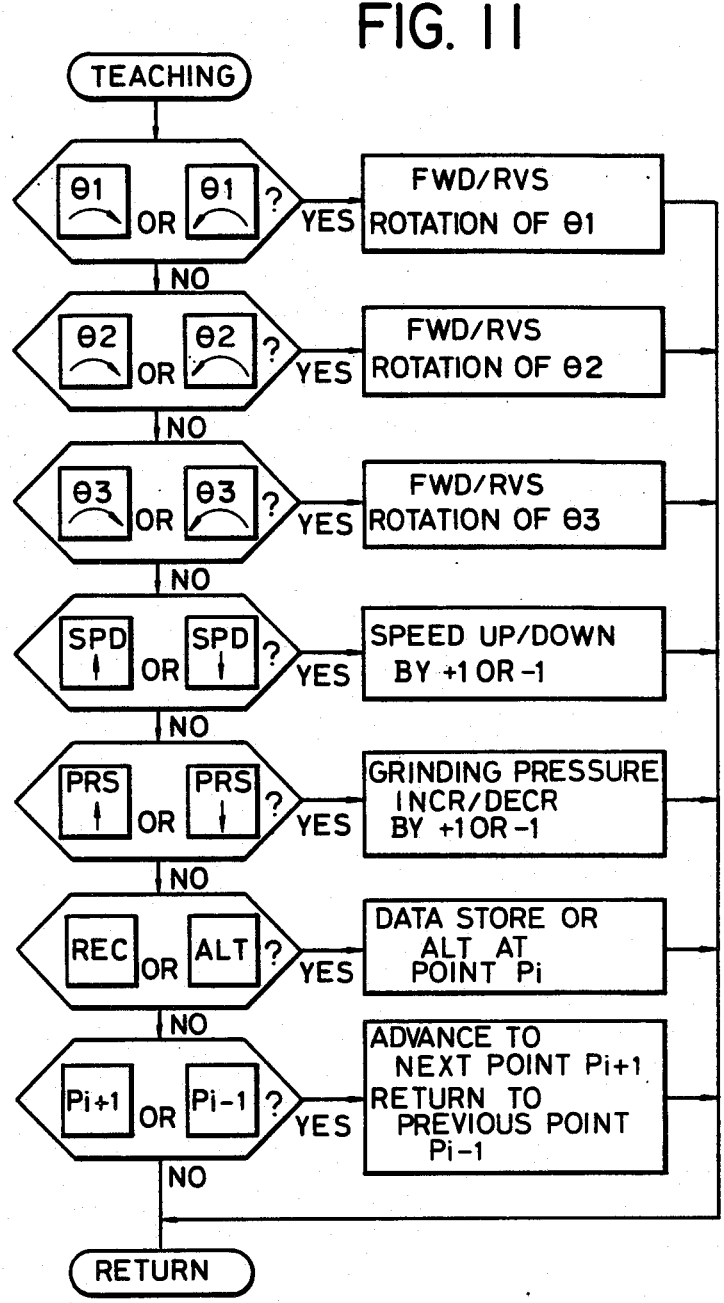
FIG. 11 is a flow chart showing the operation of a teaching box of FIG. 10.

FIG. 10 is a detailed plan view showing an example of the glass plate 1 having an end face to be ground, and FIG. 11 is a flow chart showing the operation of a teaching box 24. Data representing the outer periphery of the glass plate 1 is sampled about a plurality of sampling points along the outer contour by determining a movement path of the grinding wheel 4 by operating the teaching box 24 connected to the interface 18 shown in FIG. 9. Since interpolation (first or secondary order) is performed on the NC operation, a sampling distance is set to be long in a portion of the outer shape of the glass having a small radius of curvature, and is set short in a portion having a large radius of curvature.

The teaching box 24 has forward/reverse instruction keys for the first to third shafts $\theta 1$ to $\theta 3$, and drive instructions by the key operation are processed by the CPUs 15 and 16 and are supplied through the interface 19 and the servo units 20 to 22 to the corresponding servo motors SM1 to SM3 of the respective shafts, thereby aligning the grinding wheel at the respective sampling points and orienting the application direction of the pneumatic cylinder 7 in a normal direction.

Sixteen grinding speeds, for example, can be set at each sampling point using an SPD ↑ (speed up) key or an SPD ↓ (speed down) key. Furthermore, if needed, 8 grinding pressures, for example set using a PRS ↑ (pressure increase) key or a PRS ↓ (pressure decrease) key. The grinding pressure is adjusted only when the grinding margin cannot be set uniform only by grinding speed control. For example, in an X portion (small R portion) having a very large radius of curvature in FIG. 10, since the grinding margin is too large, the grinding pressure is decreased. In a Y portion (concave R portion) having a negative radius of curvature, since the grinding margin is too small, the grinding pressure is increased.

Teaching data at each sampling point Pi is stored in the external storage device 17 in the form of count value of the outputs of respective pulse generators and preset values of the grinding speed and pressure. A storage instruction can be supplied by a REC (record) key or an ALT (alter) key. The ALT key is used to alternate previous data at the corresponding sampling point when the movement path of the grinding wheel is to be corrected. When teaching for one sampling point Pi is completed, a Pi+1 key is depressed so as to advance the point to the next sampling point. When a Pi−1 key is depressed, the point is returned to the previous sampling point, thereby confirming a trace path.

In addition to the contour trace data of the glass plate 1, an introduction path and a speed for moving the grinding wheel 4 from its reset position to a grinding start position of the glass end face can be set by using the teaching box 24. Therefore, a speed in the case when the grinding wheel 4 abuts against the glass end face is set low so as to prevent the glass from being damaged due to abrupt grinding start.

Figure 12:
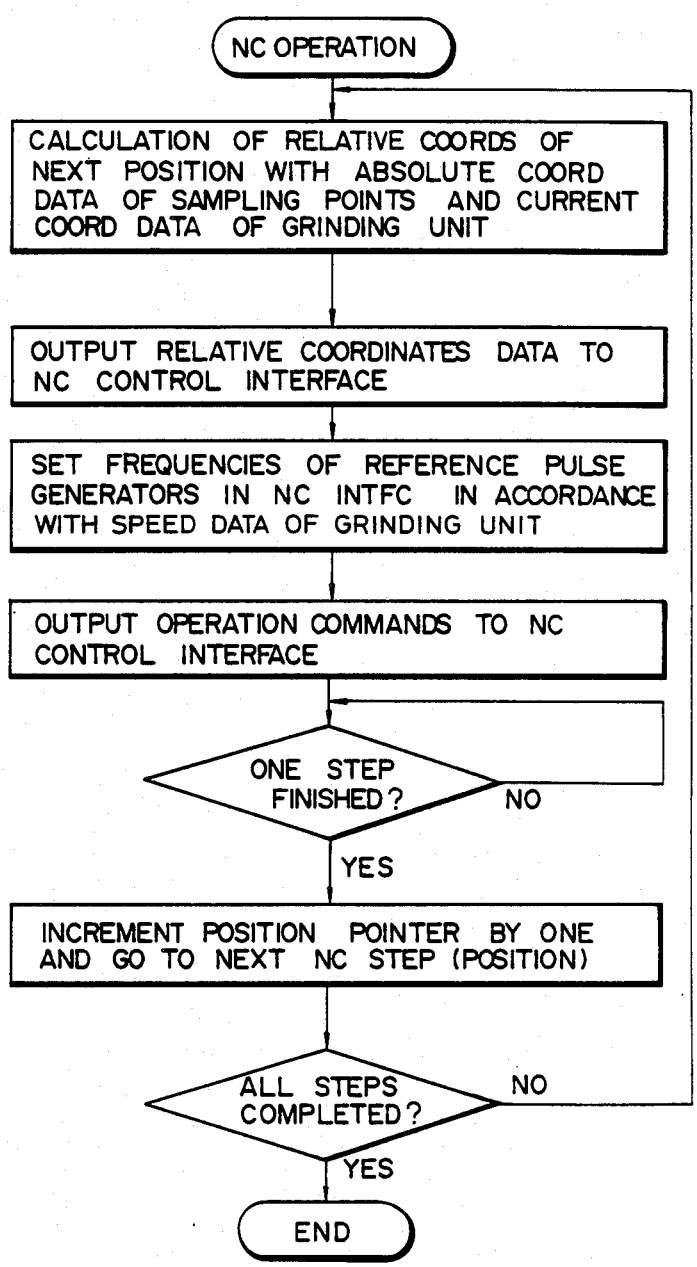
FIG. 12 is a flow chart of an NC control flow.

FIG. 12 is a schematic flow chart of NC control. An NC drive instruction is generated from the CPU 16, and NC control for the three shafts is initiated. Absolute coordinate data of the respective sampling points are given by teaching, and relative coordinates of the grinding unit are calculated from the absolute coordinate data and current coordinate data of the respective shafts. The calculated relative coordinate data is supplied to the NC control interface 19. A frequency of a fundamental pulse generator of the NC control interface 19 is set in accordance with the speed data. Thus, trace path and speed data of NC control to the next point can be determined. A drive instruction is supplied to the NC control interface 19 for the three shafts at the same time, and the NC control of the grinding unit 5 is performed by means of linear or curvilinear interpolation. When an operation for one step is completed, an end pulse is supplied from the interface 19 to the CPU 16, and a position pointer is incremented by one. Then, control data for the next point is read out under the control of the CPU 16, and coordinate operation and the like is executed again. In this manner, when all the steps are completed, the end-face grinding operation for a glass plate is completed.

Figure 13:
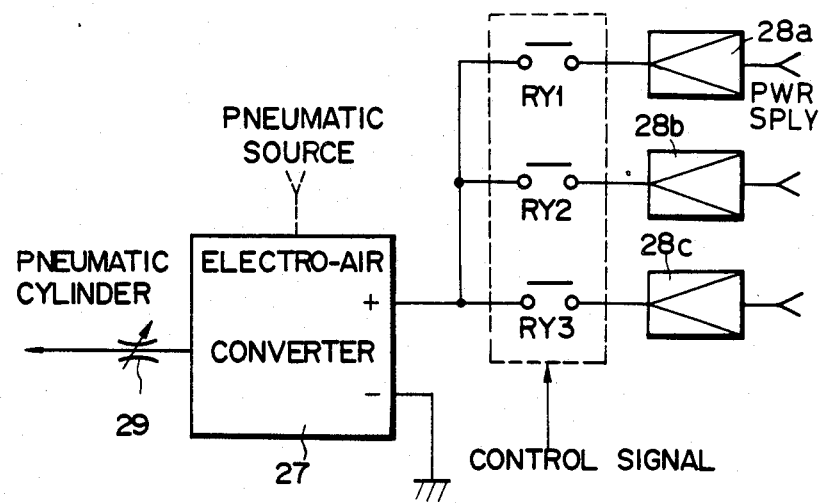
FIG. 13 is a block diagram showing an example of a pneumatic pressure control unit for controlling the grinding pressure.

FIG. 13 is a block diagram showing an example of a pneumatic pressure control unit for adjusting the grinding pressure. An electro-air converter 27 is used as a pneumatic pressure adjusting means. The converter comprises a solenoid and a pressure adjusting valve, and can obtain a pneumatic pressure output proportional to an input current. 1 mA, 2 mA and 3 mA constant current sources 28a, 28b and 28c are prepared as current input sources, and 8 currents can be obtained by selecting combinations of these outputs by relays RY1 to RY3. A 3-bit control signal for the relays RYI to RY3 is supplied from the pneumatic cylinder controller 23 in FIG. 9 in accordance with teaching data. The synthesized control input current is supplied to a current input terminal of the converter 27, and the corresponding pneumatic pressure output is supplied to the pneumatic cylinder through a throttle valve 29, thus applying a desired grinding pressure.

Alternatively, the output from the pneumatic cylinder controller 23 may be converted into an analog signal by a D/A converter and can then be supplied to the converter 27.

Figure 14:
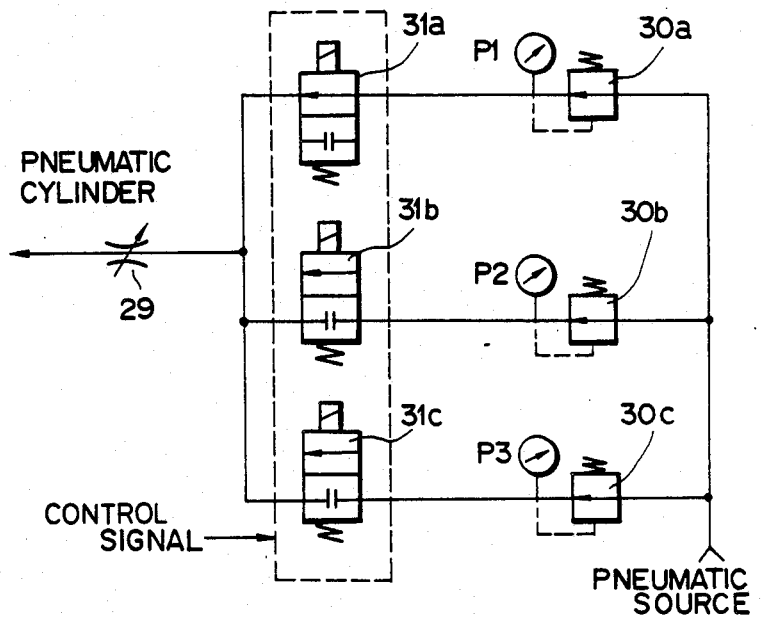
FIG. 14 is a block diagram showing another embodiment of the pneumatic pressure control unit.

FIG. 14 is a block diagram showing another embodiment of a pneumatic pressure control unit. In this embodiment, pneumatic pressures P1, P2 and P3 adjusted through pressure adjusting valve 30a to 30c are synthesized (selectively added) by opening/closing solenoid valves 31a to 31c, and can be derived to the pneumatic cylinder as the adjusted pneumatic pressure output. The solenoid valves 31a to 31c are operated by a 3-bit pneumatic pressure control signal in the same manner as in FIG. 12.

Note that in order to obtain a uniform grinding margin, a rotating speed of the drive motor 55 of the grinding wheel 4 can be partially controlled in accordance with the reset data while the grinding wheel surrounds the end face of the glass plate 1 so as to correct the grinding margin in addition to the above-mentioned grinding speed and grinding pressure controls.

According to the present invention, end-face grinding is performed by positional control of a grinding tool by means of a contour trace means comprising a one joint type horizontal pivot arm. An application direction of a grinding pressure is controlled to be always in a direction normal to a contour end face. The grinding pressure can be controlled in accordance with preset data. Thus, automatic grinding can be performed with a simple apparatus, and a uniform grinding margin can be obtained in consideration with radius of curvature, concavity, convexity of the end face to be ground.

What is claimed is:

1. An end-face grinding apparatus, comprising:
a contour tracing means for controlling the position of a grinding unit along a contour of a plate material to be end-face ground;
said contour tracing means comprises a one-joint type horizontal pivot arm means for controlling the position of the grinding unit with a numerical control means;
said horizontal pivot arm means comprises a first horizontally extending pivot arm having a base end and a distal end, pivoted at said base end on a first vertically extending axis which is at a base frame of said contour tracing means; a second horizontally extending pivot arm having a base end and a distal end, pivoted at said base end on a second vertically extending axis of a joint at said distal end of said first pivot arm; said grinding unit pivotally attached to a third vertically extending axis at said distal end of said second pivot arm to direct said grinding unit in a direction normal to an end face of the plate material for applying a grinding pressure; and respective drive means of the first to third axes;
said grinding unit comprises a means for supplying the grinding pressure to a grinding tool against said end face, the pressure being directed in a direction normal to the end face by said third axis drive means;
said numerical control means comprising a control data memory for storing control data, said control data comprising angular control data about the first and second axes for controlling the horizontal position of said grinding unit, and angular control data abaout the third axis for facing said grinding unit in the direction normal to the contour of the plate material; and a control circuit means for controlling said respective drive means of the first to third axes in accordance with readout data from the memory.

2. An end face grinding apparatus according to claim 1, wherein said grinding unit comprises:
a grinding wheel attached to an end of a spindle extending parallel to said third axis;
a grinding wheel drive motor coupled to another end of said spindle;
a guide means for mobably guiding said spindle in a direction perpendicular to said third axis; and
a pressure cylinder unit for urging said spindle in the guided direction.

3. An end face grinding apparatus according to claim 1, further comprising a support base for horizontally supporting said plate material, said support base comprising suction pad means provided upward on the support base for fixing the plate material, and a rotating means for rotating said fixed plate material in a horizontal plane.

4. An end face grinding apparatus according to claim 1, further comprising support arm means incorporated with said pivot arm means, for supporting the weight of said grinding unit so as to swing in a horizontal plane, said support arm means comprising:
a first horizontal pivot arm;
a joint provided to a distal end of said first arm;
a second horizontal pivot arm extending from said joint;
a support shaft for rotatably supporting said grinding unit at the distal end of said second arm; and
a cranked link member for linking said grinding unit with said third axis so that said support shaft is aligned with the third axis.

5. An end face grinding apparatus according to claim 1, further comprising:
   a third horizontal pivot arm provided to the third axis, said grinding unit being attached to the distal end of said third pivot arm; and
   a rotational actuator provided to said third axis for urging said third pivot arm to press said grinding unit against the end face of the plate material, and wherein said third axis is position-controlled so as to keep said third pivot arm along the contour of the plate material in parallel with a tangent line thereof.

6. An end face grinding apparatus according to claim 1, wherein said control data corresponds to plurality of discrete points along the contour, and said control circuit means has a linear or arc interpolation function between two adjacent discrete points.

7. An end face grinding apparatus according to claim 1, wherein said control data includes tracing speed data and said control circuit means shares said speed data as a part of control factor between the first and second axes.

8. An end face grinding apparatus according to claim 1, further comprising pressure means for supplying a grinding pressure to a grinding tool against the end face and pressure control means for controlling the pressure of said pressure means with grinding pressure data preset in accordance with the shape of the contour of the plate material.

9. An end face grinding apparatus according to claim 8, wherein said pressure means comprises a pneumatic cylinder, and said pressure control means comprises an electro-air converter for supplying controlled air to said pressure cylinder in accordance with a pressure control signal and a digital-analog converting means for converting a digital pressure control signal to an analog pressure control signal to be supplied to saie electro-air converter.

10. An end face grinding apparatus according to claim 8, wherein said pressure means comprises a pneumatic cylinder, and said pressure control means comprises plurarity of binary weighted pneumatic sources and valve means for selectively adding the output of said pneumatic sources in accordance with digital control data to supply pressure controlled air to said cylinder.

11. An end face grinding apparatus according to claim 1, further comprising external operating means for manually supplying to said drive means of the first to third axes operating command data through said control circuit means so as to control the position and direction of said grinding unit along the contour of a model type to be end-face ground, said operating command data being stored as teaching data at every descrete sampling points along the contour.

12. An end face grinding apparatus according to claim 11, wherein said external operating means comprises an input means of tracing speed data of the grinding unit along the contour of the plate material.

13. An end face grinding apparatus according to claim 1, wherein said contour tracing means is installed at a fixed point and said plate material is shiftable in a horizontal plane by a movable support means so as to expand the operating area of said contour tracing means by said shift of said plate material.

14. An end face grinding apparatus according to claim 1, wherein said plate material is a glass plate.

* * * * *